United States Patent
Murase et al.

(10) Patent No.: US 9,748,547 B2
(45) Date of Patent: Aug. 29, 2017

(54) METHOD FOR PRODUCING ELECTRODE/SEPARATOR LAMINATE, AND LITHIUM-ION RECHARGEABLE BATTERY

(71) Applicant: ZEON CORPORATION, Tokyo (JP)

(72) Inventors: Tomoya Murase, Kanagawa (JP); Yujiro Toyoda, Toyama (JP); Takuya Kaneda, Kanagawa (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/646,701

(22) PCT Filed: Nov. 26, 2013

(86) PCT No.: PCT/JP2013/081715
§ 371 (c)(1),
(2) Date: May 21, 2015

(87) PCT Pub. No.: WO2014/081035
PCT Pub. Date: May 30, 2014

(65) Prior Publication Data
US 2015/0311490 A1 Oct. 29, 2015

(30) Foreign Application Priority Data

Nov. 26, 2012 (JP) ................................. 2012-257653

(51) Int. Cl.
| | |
|---|---|
| *H01M 2/16* | (2006.01) |
| *H01M 4/139* | (2010.01) |
| *H01M 2/14* | (2006.01) |
| *H01M 10/0525* | (2010.01) |
| *H01M 10/052* | (2010.01) |
| *C09J 133/26* | (2006.01) |
| *H01M 4/62* | (2006.01) |

(52) U.S. Cl.
CPC ........... *H01M 2/168* (2013.01); *C09J 133/26* (2013.01); *H01M 2/145* (2013.01); *H01M 4/139* (2013.01); *H01M 10/052* (2013.01); *H01M 10/0525* (2013.01); *C09J 2433/003* (2013.01); *H01M 4/62* (2013.01)

(58) Field of Classification Search
CPC .......................... H01M 2/1673; H01M 2/1686
See application file for complete search history.

(56) References Cited

U.S. PATENT DOCUMENTS

| | | | |
|---|---|---|---|
| 2007/0207376 A1* | 9/2007 | Call | .................... B29C 47/0026 429/129 |
| 2009/0111026 A1 | 4/2009 | Kim et al. | |
| 2012/0189897 A1* | 7/2012 | Wakizaka | ............. H01M 2/145 429/144 |
| 2015/0188108 A1 | 7/2015 | Miyazawa et al. | |
| 2015/0333308 A1 | 11/2015 | Toyoda et al. | |

FOREIGN PATENT DOCUMENTS

| | | |
|---|---|---|
| EP | 2835844 A1 | 2/2015 |
| EP | 2879206 A1 | 6/2015 |
| JP | 2003-282061 A | 10/2003 |
| JP | 2005-019156 A | 1/2005 |
| JP | 2007-123254 A | 5/2007 |
| JP | 2012-076255 A | 4/2012 |
| JP | 2012-089346 A | 5/2012 |
| WO | 2008/097013 A1 | 8/2008 |
| WO | 2011/040562 A1 | 4/2011 |
| WO | 2013/047853 A1 | 4/2013 |
| WO | 2014/017651 A1 | 1/2014 |

OTHER PUBLICATIONS

International Preliminary Report on Patentability and Translation of Written Opinion of the International Searching Authority; PCT/JP2013/081715 issued on May 26, 2015.

The extended European search report issued by the European Patent Office on Mar. 31, 2016, which corresponds to European Patent Application No. 13856655.9-1373 and is related to U.S. Appl. No. 14/646,701.

International Search Report; PCT/JP2013/081715; Mar. 11, 2014.

\* cited by examiner

*Primary Examiner* — Olatunji Godo
(74) *Attorney, Agent, or Firm* — Studebaker & Brackett PC

(57) ABSTRACT

To provide a method for producing an electrode/separator laminate which, when producing the electrode/separator laminate by subjecting the electrode and separator with adhesive layer to thermocompression bonding, the separator and the electrode can be bonded with adequate adhesion, without detriment to ion conductivity. [Solution] This method for producing an electrode/separator laminate includes a step in which a separator with adhesive layer comprising a porous polyolefin film having an adhesive layer at least on one side, and an electrode which has an electrode active substance layer containing an electrode active substance and an electrode binder, are laminated in such a manner that the adhesive layer and the electrode active substance layer touch one another, and are subsequently subjected to thermocompression.

20 Claims, No Drawings

METHOD FOR PRODUCING ELECTRODE/SEPARATOR LAMINATE, AND LITHIUM-ION RECHARGEABLE BATTERY

TECHNICAL FIELD

The present invention relates to a method for producing electrode/separator laminate, and particularly to a method for producing electrode/separator laminate used as a constituting element of a lithium ion secondary battery; and also it relates to the lithium ion secondary battery incorporating said electrode/separator laminate.

BACKGROUND ART

Recently, the portable terminals such as laptop computer, mobile phone and PDA are widely used. For secondary batteries used for power sources of these portable terminals, nickel hydrogen secondary battery, lithium ion secondary battery or so are heavily used. The portable terminals are rapidly downsized, made thinner, have become lighter, and has higher performance. As a result, the portable terminals are used in various occasions.

Also, for the battery, it is required to be smaller, thinner, and lighter and to have higher performance. As for the shape of the battery, in order to correspond to the button cell, cylinder cell and also to correspond to the thinning, the battery of a flat parallelepiped shape so called a pouch type laminate cell is in increase.

The constituting element of these batteries are mainly an electrode (positive electrode and negative electrode), a porous separator present between these electrodes, and an electrolytic solution or so. The battery is obtained by rolling up the laminate (the electrode/separator laminate) of the electrode and the porous separator, and after housed in the predetermined container, the electrolytic solution is filled, then it is sealed. In the secondary battery, the adhesiveness between the electrode and the porous separator may decline in some cases due to the heat generation, the expansion and contraction of the active material due to the charge-discharge, therefore a sufficient adhesiveness is in demand in a wide temperature range.

The patent document 1 proposes the separator with the adhesive layer comprising fluorine based binder on the porous separator surface. By carrying out the thermocompression bonding to the electrode and this separator with the adhesive layer via the adhesive layer, the electrode/separator laminate with high adhesive strength between the electrode and the separator can be obtained.

PRIOR ART DOCUMENT

Patent document 1: JP Patent No. 4414165

SUMMARY OF THE INVENTION

Technical Problems to be Solved by the Invention

However, in aforementioned pouch type laminate cell, the strength of the outer package becomes weaker than the cylinder cell, thus due to the bending or distortion of the cell itself, the electrode and the separator may be shifted, or a space may be easily formed. Particularly, when the electrode and the separator are adhered via the fluorine based binder which has relatively low adhesive force, the above mentioned problem may become prominent easily.

As for the separator with the adhesive layer of the above mentioned patent document 1, the adhesive force is relatively low since it uses the fluorine based binder, thus in order to obtain the adhesive force which can correspond to the pouch type laminate cell, the adhesive layer must be thicker. Also, in case of using the fluorine based binder, after dissolving the fluorine based binder in the solvent, this is coated on to the separator and dried, thereby forms the adhesive layer. However, the fluorine based binder being dissolved tends to easily infiltrate to the pore of the separator, thus after the solvent is removed, the fluorine based binder remains in the pore of the separator, which some time causes to compromise the ionic conductivity of the separator. Also, the thickness of the adhesive layer may become the cause to compromise the ionic conductivity.

Therefore, the object of the present invention is to provide the method for producing the electrode/separator laminate which is capable of adhering the separator and the electrode by sufficient adhesive strength, and also does not compromise the ionic conductivity.

Means for Solving the Problems

As a result of keen examination to solve the above object, the present inventors have found that the object can be solved by constituting the adhesive layer of the separator with the adhesive layer with plurality of types of the particulate polymers having different glass transition temperatures, and by having predetermined thickness, then carrying out the thermocompression bonding between the adhesive layer and the electrode at the predetermined temperature.

The gist of the present invention is as described in the following.

(1) A method for producing electrode/separator laminate comprising, a step of laminating a separator with adhesive layer which comprises an adhesive layer on at least one side of a porous polyolefin film, and an electrode comprising an electrode active material layer including an electrode active material and an electrode binder, so that said adhesive layer and said electrode active material layer are in contact, then carrying out a thermocompression bonding, wherein said adhesive layer includes a particulate polymer A having a glass transition temperature of −50 to 5° C. and a particulate polymer B having a glass transition temperature of 50 to 120° C., a thickness of said adhesive layer is 0.2 to 1.0 μm, and said thermocompressing bonding is carried out at 50 to 100° C.

(2) The method for producing electrode/separator laminate as set forth in (1), wherein a number average particle diameter of said particulate polymer A and said particulate polymer B is 0.1 to 1 μm.

(3) The method for producing electrode/separator laminate as set forth in (1) or (2), wherein said electrode binder includes a particulate polymer having a glass transition temperature of −50 to 5° C.

(4) The method for producing electrode/separator laminate as set forth in any one of (1) to (3) comprising a step of coating an aqueous dispersion slurry for the adhesive layer including the particulate polymer A and the particulate polymer B, and having the viscosity of 0.001 to 0.1 Pa·s on said porous polyolefin film, and drying thereof, thereby obtaining the separator with adhesive layer.

(5) The method for producing electrode/separator laminate as set forth in (4), wherein a solid concentration of said aqueous dispersion slurry for the adhesive layer is 1 to 20 wt %.
(6) The method for producing electrode/separator laminate as set forth in any one of (1) to (5), wherein a swelling ratio of said particulate polymer A and said particulate polymer B when immersed in a mixed solvent (ethylene carbonate/diethyl carbonate=1/2 (volume ratio)) including lithium salt $LiPF_6$ (concentration of 1 mol/L) is 1 to 5 times.
(7) A lithium ion secondary battery comprising electrode/separator laminate obtained by the production method as set forth in any one of (1) to (6).
(8) An aqueous dispersion slurry for the adhesive layer used for adhering an electrode with a porous olefin film, wherein said aqueous dispersion slurry comprises a particulate polymer A having a glass transition temperature of −50 to 5° C. and a particulate polymer B having a glass transition temperature of 50 to 120° C., and has the viscosity of 0.001 to 0.1 Pa·s.
(9) The aqueous dispersion slurry for the adhesive layer as set forth in (8), wherein a number average particle diameter of said particulate polymer A and said particulate polymer B is 0.1 to 1 μm.

Effect of the Present Invention

According to the present invention, the adhesive layer on the surface of the separator is constituted by plurality of types of the particulate polymers with different glass transition temperatures, hence a thin adhesive layer can be realized. Also, the particulate polymer scarcely infiltrates to the pores of the separator, thus the ionic conductivity will not be compromised. Further, by using this adhesive layer, and by carrying out the thermocompression bonding at the predetermined temperature, the adhesive strength between the electrode and the separator will be enhanced; thereby a sufficient reliability (specifically, the rate characteristic or the cycle characteristic or so) can be obtained even when it is used for the pouch type laminate cell.

Embodiments to Carry Out the Invention

Herein below, the present invention will be described in detail. The method for producing the electrode/separator laminate of the present invention comprises the step of laminating the separator with the adhesive layer and the electrode so that said adhesive layer and said electrode active material layer are in contact, then carrying out the thermocompression bonding.
(The Separator with the Adhesive Layer)
The separator with the adhesive layer comprises adhesive layer on one side or both sides of the porous polyolefin film.
As for the porous polyolefin film, various porous polyolefin films can be used without particular limitation which has been used conventionally as the separator for the lithium ion secondary battery. As for the polyolefin film constituting the porous polyolefin film, homopolymer such as polyethylene and polypropylene or so, copolymer and the mixtures thereof may be mentioned.
As for the polyethylene, the polyethylene with low density, intermediate density and high density or so may be mentioned, and from the point of the nail penetration strength or the mechanical strength or so, the high density polyethylene is preferable. Also, these polyethylenes may be mixture of two or more for providing the flexibility.

As polypropylene, homopolymer, random copolymer, block copolymer or so may be mentioned, and one or two or more may be mixed for use. Also, there is no particular limit for the stereoregularity, and isotactic or syndiotactic or atactic or so can be used, however it is preferable to use isotactic polypropylene as it is inexpensive. Further, within the range which does not compromise the effect of the present invention, polyolefin may be added with polyolefins other than polyethylene or polypropylene, and additives such as antioxidant, nucleating agent or so in appropriate amount.

As for the method for producing the porous polyolefin film, the known method may be mentioned. For example, a dry method wherein a film is formed from polypropylene and polyethylene or so by melt extrusion method, then growing the crystal domain by annealing at low temperature, and carrying out the stretching under such condition to stretch the amorphous area thereby forming fine porous film; or a wet method wherein a polypropylene and polyethylene, and hydrocarbon solvent or other low molecular weight material are mixed, then forming a film, and removing said solvent and low molecular weight material using other solvent which easily evaporates from the film which has started to form a islet phase made by the solvent or the low molecular weight grouping together in the amorphous phase; or so may be selected. Among these, the dry method is preferable from the point of reducing the resistance and from the point that large pore can be easily obtained.

The thickness of the porous polyolefin film is usually 0.5 to 40 μm, preferably 1 to 30 μm, and more preferably 1 to 20 μm. By making the thickness of the porous polyolefin film within said range, the resistance of the porous polyolefin film in the battery becomes smaller, and also the processability during the battery production is excellent.

The porous polyolefin film used in the present invention may comprise filler or fibrous compound in order to control the strength or rigidity, and the thermal shrinkage ratio. Also, in order to improve the adhesiveness with the adhesive layer, and to improve the impregnating property of the liquid by lowering the surface tension of the electrolytic solution, the porous polyolefin film surface may be carried out with coating treatment by the low molecular weight compound or the high molecular weight compound in advance, or may be carried out with electromagnetic ray treatment such as ultraviolet ray or so, or may be carried out with the plasma treatment such as corona discharge/plasma gas or so. Particularly, from the point of having high impregnating property of the electrolytic solution and from the point that the adhesiveness between he heat resistant layer can be obtained easily, it is preferable to carry out the coating treatment with the high molecular weight compound comprising polar group such as carboxylic acid group, hydroxylic acid group or sulfonic acid group or so.

The porous polyolefin film used in the present invention may have multilayer structure by stacking said porous polyolefin film against each other, in order to enhance the tear strength or the nail penetration strength. Specifically, the laminate of the porous polyethylene film and the porous polypropylene film, and the laminate between the unwoven fabric and the porous polyolefin film or so may be mentioned.

The adhesive layer comprises the particulate polymer A having relatively low glass transition temperature, and the particulate polymer B having relatively high glass transition temperature; and the average thickness of the adhesive layer is 0.2 to 1.0 μm.

The glass transition temperature of the particulate polymer A is −50 to 5° C., preferably −45 to −10° C., and more preferably −40 to −20° C. The particulate polymer A has the low glass transition temperature, and has the high adhesiveness. However, if the glass transition temperature is too low, the tackiness may become too much, which may cause a blocking of the separator with the adhesive layer, or it may cover the pore of the porous polyolefin film, which may cause to compromise the ionic conductivity, and lower the rate characteristic and the cycle characteristic of the battery. As the particulate polymer A, by selecting the polymer having the above mentioned glass transition temperature, the adhesive layer will have sufficient adhesiveness, and prevents the powder fall off from the adhesive layer, while reducing the blocking of the separator with the adhesive layer, and further the rate characteristic and the cycle characteristic of the battery are improved. Note that, the blocking of the separator with adhesive layer refers to the fusion of the adhesive layer against each other.

The glass transition temperature of the particulate polymer B is 50 to 120° C., preferably 60 to 110° C., and more preferably 65 to 105° C. The particulate polymer B has relatively high glass transition temperature and does not have high adhesiveness, however by using the particulate polymer B, the stickiness of the adhesive layer surface can be controlled, and the blocking of the separator with the adhesive layer can be prevented. However, if the glass transition temperature is too high, the adhesiveness becomes insufficient, and the particulate polymer B may fall off from the adhesive layer (powder fall off), thereby the cycle characteristic may be compromised. As the particulate polymer B, by selecting the particulate polymer having the above mentioned glass transition temperature, the adhesive layer will have sufficient adhesiveness, and the powder fall off from the adhesive layer is prevented, further the blocking of the separator with the adhesive layer is reduced, and the rate characteristic and the cycle characteristic of the battery are improved.

The glass transition temperature of the particulate polymer A and B are measured for example by Differential Scanning calorimetry (DSC), and also by changing the monomer composition constituting the polymer as mentioned in below, a polymer with appropriate glass transition temperature can be obtained.

The average thickness of the adhesive layer is 0.2 to 1.0 µm, preferably 0.4 t 0.9 µm, and more preferably 0.5 to 0.9 µm. The average thickness of the adhesive layer is the average value of the thickness of five arbitrary points selected and measured using highly accurate thickness measuring device. By setting the average thickness of the adhesive layer within the above mentioned range, a sufficient adhesiveness can be obtained, and the pores of the porous polyolefin are not covered, thus the ionic conductivity can be maintained. On the other hand, if the average thickness of the adhesive layer exceeds the above range, the adhesive layer covers the pores of the porous polyolefin film, and the ionic conductivity may be compromised. Also, if the average thickness of the adhesive layer is less than the above mentioned range, the adhesive force becomes insufficient, and the electrode and the separator tends to easily released, and the cycle characteristic of the battery may be compromised.

The number average particle diameter of the particulate polymer A and the particulate polymer B may be same or different, however both are preferably 0.1 to 1 µm, more preferably 0.2 to 0.8 µm, and particularly preferably 0.3 to 0.7 µm. When the adhesive layer is constituted by the particulate polymers having the above mentioned particle diameter range, the particulate polymer will not cover the pores of the porous polyolefin films, and thus ionic conductivity can be maintained. On the other hand, if the number average particle diameter of the particulate polymer is too small, the particulate polymer will enter the pores of the porous polyolefin film, and the conducting pathway of the ions is interrupted, thus the ionic conductivity may be compromised. Also, if the number average particle diameter of the particulate polymer is too large, the resistance of the adhesive layer increases, and the rate characteristic of the battery may be compromised. The number average particle diameter of the particulate polymer is the number average particle diameter is obtained by measuring 100 particulate polymers which is selected arbitrarily from the image of the transmission electron microscope, and then by calculating the arithmetic average thereof. The shape of the particle may be spherical shape or atypical shape.

The adhesive layer has a structure wherein 1 to 3 or so of the above particulate polymers is stacked in the thickness direction, thereby sufficient adhesive strength can be obtained even though it is thin, and also excellent ionic conductivity can be obtained.

The weight ratio (A/B) between the particulate polymer A and the particulate polymer B of the adhesive layer is not particularly limited, however preferably it is within the range of preferably 1/99 to 40/60, more preferably 5/95 to 30/70, and particularly preferably 10/90 to 20/80. If particulate polymer is too much, then the particulate polymer A covers the pores of the porous polyolefin film, and the ionic conductivity may be compromised. Also, if the particulate polymer B is too much, the adhesiveness may be insufficient, and the particulate polymer may be easily fall off from the adhesive layer, thereby the cycle characteristic of the battery may be compromised.

The particulate polymer A and the particulate polymer B preferably have the swelling ratio against the electrolytic solution within the predetermined range. Specifically, the swelling ratio when immersing in the mixed solvent (ethylene carbonate/diethyl carbonate=1/2 (volume ratio)) comprising lithium salt $LiPF_6$ (concentration of 1 mol/L) is preferably 1 to 5 times, more preferably 1 to 4.5 times, and particularly preferably 1 to 4 times. By having the swelling ratio of the particulate polymer A and the particulate polymer B within the above mentioned range, the adhesive force of the adhesive layer after constituting the battery can be maintained, and the cycle characteristic can be improved. On the other hand, if the swelling ratio exceeds the above mentioned range, the ionic conductivity of the adhesive layer is compromised, and the rate characteristic may deteriorate. Also, the adhesive force of the adhesive layer after constituting the battery may decline and the cycle characteristic may be compromised.

By regulating the type or the ratio of the entire monomer unit constituting the particulate polymer, the swelling ratio of the particulate polymer against the electrolytic solution can be regulated within the above mentioned range. For example, as the below described (meth)acrylate monomer unit, the method of regulating by the length of the alkyl chain bonding to non-carbonyl oxygen atom in said monomer unit or so may be mentioned.

As the method for setting the swelling ratio within the above mentioned range, for example the method of controlling the solubility parameter (hereinafter, it will be referred as SP value) of the particulate polymer preferably within 8 to 13 $(cal/cm^3)^{1/2}$, more preferably 9 to 12 $(cal/cm^3)^{1/2}$ or so may be mentioned. If the solubility parameter is less than 8

$(cal/cm^3)^{1/2}$, then the ion diffusion of the electrolytic solution is interfered, and the internal resistance may become large, further the adhesive strength may decline significantly. On the other hand, if the solubility parameter exceeds 13 $(cal/cm^3)^{1/2}$, then the internal resistance becomes large, and the flexibility of the adhesive layer declines, thus the adhesive strength may decline significantly.

The solubility parameter may be determined by the method described in "Polymer Handbook" VII Solubility Parament Values, pp 519-559, edited by E. H. Immergut (John Wiley & Sons, Third Edition, published in 1989). For those which are not described in this publication, it can be determined in accordance with a "molecular attraction constant method" proposed by Small. In this method, the SP value (δ) of a compound is determined from the following formula using the molecular volume of the molecule of the compound and the sum of molecular attraction constants (G), the molecular weight (M), and the specific gravity (d) which are characteristic values of the functional groups (atomic groups) constituting the molecule of the compound.

$\Delta = \Sigma G/V = d\Sigma G/M$ (V; the specific volume, M; the molecular weight, d; the specific gravity)

The separator with the adhesive layer made of the porous polyolefin film comprising the adhesive layer made of such particulate polymers A and B on one side or both sides will not have covered pores of the porous polyolefin by the particulate polymers even after the thermocomporession, and it shows excellent ionic conductivity. As for the index of the porosity showing ionic conductivity, the Gurley permeability is checked and evaluated, and it is confirmed that in the separator with adhesive layer of the present invention, no significant change in the porosity is found before and after the thermocompression bonding. Specifically, the Gurley permeability X of the before the thermocompression bonding of the separator with adhesive layer is preferably 100 to 300 sec/100 cc, more preferably 100 to 270 sec/100 cc, and particularly preferably 100 to 250 sec/100 cc. On the other hand, the Gurley permeability Y of after the thermocompression bonding is preferably 100 to 900 sec/100 cc, more preferably 100 to 500 sec/100 cc and particularly preferably 100 to 360 sec/100 cc.

Note that, after the thermocompression bonding of the electrode and the separator, it is difficult to separator the two, thus the permeability of the separator with adhesive layer of after the thermocompression bonding can not be measured directly. Thus, in the present invention, the thermocompression bonding of the release film and the separator with adhesive layer is carried out under the same condition as the thermocompression bonding of the electrode and the separator, then the release film is released after the thermocompression bonding, then the permeability of the separator with adhesive layer is measured, thereby the permeability Y of the separator with adhesive layer after the thermocompression bonding is determined.

Also, the ratio (the permeability changing ratio=the permeability Y/the permeability X) of the permeability of before and after the thermocompression bonding is preferably less than 3, more preferably 1 to 2, and particularly preferably 1 to 1.5. Further, there is no significant change in the porosity at before and after the thermocompression bonding, thus the ionic conductivity will not be compromised by carrying out the thermocompression bonding to the separator and the electrode.

If the adhesive layer of the separator with adhesive layer becomes thick, the pores of the separator become easily covered, thereby the permeability of the separator with the adhesive layer declines, and the Gurley permeability tends to increase. Also, if the glass transition temperature of the particulate polymer is low, depending on the condition of the compression bonding, the original shape of the particulate polymer collapses, and the pores of the separator are covered, thus the permeability declines, hence the Gurley permeability tends to easily increase. Also, if the temperature of the compression bonding is too high, the particulate polymer deforms into film form, and the pores of the separator will be covered, thus the permeability declines and the Gurley permeability tends to easily increase.

The particulate polymer A and the particulate polymer B are not particularly limited as long as the above mentioned physical properties are satisfied, and the particulate polymer conventionally used as the binder for the battery can be used. As such particulate polymer, for example, high molecular weight compounds such as acrylic polymer, diene polymer, polyimide, polyamide, polyurethane or so may be mentioned; and among these, from the point of the adhesiveness and electrolytic solution resistance or so, acrylic polymer or diene polymer are preferable, and further preferably it is acrylic polymer.

The acrylic polymer is the polymer including 10 wt % or more of monomer unit derived from the compound expressed by the general formula (1): $CH_2=CR^1-COOR^2$ (in said formula, $R^1$ is hydrogen atom or methyl group, $R^2$ is alkyl group or cycloalkyl group). As the specific examples of the monomer constituting the monomer unit of the compound expressed by the general formula (1), acrylates such as methyl acrylate, ethyl acrylate, propyl acrylate, isopropyl acrylate, n-butyl acrylate, isobutyl acrylate, t-butyl acrylate, n-amyl acrylate, isoamyl acrylate, n-hexyl acrylate, 2-ethylhexyl acrylate, lauryl acrylate, stearyl acrylate or so; methacrylates such as methyl acrylates, ethyl methacrylate, propyl methacrylate, isopropyl methacrylate, n-butyl methacrylate, isobutyl methacrylate, t-butyl methacrylate, n-amyl methacrylate, isoamyl methacrylate, n-hexyl methacrylate, 2-ethylhexyl methacrylate, lauryl methacrylate, stearyl methacrylate or so may be mentioned. Among these, acrylates are preferable, and n-butyl acrylate and 2-ethylhexyl acrylate are particularly preferable as these can improve the adhesive strength.

Said acrylic polymer preferably includes nitrile group containing monomer unit besides the monomer unit shown by the general formula (1). As the specific example of the monomer constituting the nitrile group containing monomer unit, for the nitrile group containing monomer copolymerizable with the monomer constituting the monomer unit shown by the general formula (1), acrylonitrile or methacrylonitrile or so may be mentioned, and among these acrylonitrile is preferable as it has high adhesiveness.

For said acrylic polymer, besides the above monomer unit, copolymerizable carboxylic acid containing monomer can be used. As the specific examples of carboxylic acid containing monomer, monobasic acid containing monomer such as acrylic acid, methacrylic acid or so; dibasic acid containing monomer such as maleic acid, fumaric acid, itaconic acid or so may be mentioned. These monobasic acid containing monomer and dibasic acid containing monomer respectively can be used alone or by mixing two or more thereof. By comprising the carboxylic acid group containing monomer unit, the adhesive strength can be improved.

Further, as the specific example of the monomer constituting the copolymerizable monomer unit which can be included in said acrylic polymer, carboxylic acids esters comprising two or more carbon-carbon double bonds such as ethyleneglycoldimethacrylate, diethyleneglycoldimethacrylate, trimethylolpropane triacrylate or so; unsaturated esters comprising fluorine at the side chain such as perfluorooctylethyl acrylate, perfluorooctylethyl methacrylate or so; styrene based monomers such as styrene, chlorostyrene, vinyl toluene, t-butyl styrene, vinyl benzoate, methyl vinyl benzoate, vinyl naphthalene, chloromethylstyrene, hydroxymethylstyrene, α-methylstyrene, divinylbenzene or so; amide based monomers such as acrylic amide, N-methylolacrylic amide, acrylic amide-2-methylpropane sulfonate or so; olefins such as ethylene, propylene or so; diene based monomers such as butadiene, isoprene or so; halogen atom containing monomer such as vinyl chloride, vinylidene chloride or so; vinyl esters such as vinyl acetate, vinyl propionate, vinyl lactate, vinyl benzoate or so; vinyl ethers such as methyl vinyl ether, ethyl vinyl ether, butyl vinyl ether or so; vinyl ketones such s methyl vinyl ketone, ethyl vinyl ketone, butyl vinyl ketone, hexyl vinyl ketone, isopropenyl vinyl ketone or so; heterocycle containing vinyl compounds such as N-vinyl pyrrolidone, vinyl pyridine, vinyl imidazole or so; glycidyl ethers such as allylglycidyl ethers or so; glycidyl esters such as glyciyl acrylate, glycidyl methacrylate or so may be mentioned.

By appropriately setting the monomer composition as in above, the acrylic polymer comprising the desired glass transition temperature can be obtained.

When obtaining the particulate polymer A having the glass transition temperature of −50 to 5° C., it is appropriate to have more ratio of the monomer unit such as butyl acrylate or 2-ethylhexyl acrylate or so which lowers the glass transition temperature of the homopolymer. Specifically, it is preferable to make the ratio of the monomer unit such as butyl acrylate or 2-ethylhexyl acrylate or so to 80 wt % or more.

On the other hand, when obtaining the particulate polymer B having the glass transition temperature 50 to 120° C., it is suitable to lower the ratio of the monomer unit such as the above mentioned butyl acrylate, 2-ethylhexyl acrylate or so, and specifically it is preferable to make the ratio of these monomer unit to 30 wt % or less. Further, it is suitable to have more ratio of the monomer unit which increases the glass transition temperature of the monomer unit, such as styrene or so.

As the diene polymer, homopolymer of conjugated diene; copolymer of different types of the conjugated dienes against each other; a copolymer obtained by polymerizing the monomer mixture including the conjugated diene, and the hydrogenated product thereof or so may be mentioned. The ratio of the conjugated diene in said monomer mixture is usually 20 wt % or more, preferably 25 wt % or more. As said conjugated diene, for example, 1,3-butadiene, 2-methyl-1,3-butadiene, 2,3-dimethyl-1,3-butadiene, 2-ethyl-1,3-butadiene, 2-chlor-1,3-butadiene, 1,3-pentadiene, 1,3-hexadiene, and 2,4-hexadiene or so may be mentioned. Among these, 1,3-butadiene, 2-methyl-1,3-butadiene are preferable. Note that, conjugated diene may be used singularly, or by combining two or more types thereof in arbitrary ratio. The ratio of the conjugated diene in the diene polymer is preferably 20 wt % or more and 60 wt % or less, and preferably 30 wt % or less and 55 wt % or less.

As said diene polymer, other than the conjugated diene, nitrile group containing monomer may be used. As specific examples of the nitrile group containing monomer, α,β-unsaturated nitrile compound such as acrylonitrile, methacrylonitrile, α-chloroacrylonitrile, α-ethylacrylonitrile or so may be mentioned, and among these, acrylonitrile is preferable. The ratio of the content of the nitrile group containing monomer unit of the diene polymer is preferably 5 to 40 wt %, more preferably 5 to 30 wt %. By setting the amount of the nitrile group containing monomer unit of the diene polymer within the above mentioned range, the adhesive strength improves.

Also, as said diene polymer, other than above mentioned monomer, unsaturated carboxylic acids such as acrylic acid, methacrylic acid, itaconic acid, fumaric acid; styrene based monomers such as styrene, chlorostyrene, vinyl toluene, t-butyl styrene, vinyl benzoate, methyl vinyl benzoate, vinyl naphthalene, chloromethylstyrene, hydroxymethylstyrene, α-methylstyrene, divinylbenzene or so; olefins such as vinyl acetate, vinyl propionate or so; vinyl esters such as vinyl acetate, vinyl propionate, vinyl lactate, vinyl benzoate or so; amide based monomers such as acrylic amide, N-methylolacrylic amide, acrylic amide-2-methylpropane sulfonate or so; vinyl ethers such as methyl vinyl ether, ethyl vinyl ether, butyl vinyl ether or so; vinyl ketones such s methyl vinyl ketone, ethyl vinyl ketone, butyl vinyl ketone, hexyl vinyl ketone, isopropenyl vinyl ketone or so; heterocycle containing vinyl compounds such as N-vinyl pyrrolidone, vinyl pyridine, vinyl imidazole or so may be mentioned. Note that, among these, the conjugated diene and the copolymerizable monomer respectively may be used alone or by combining two or more thereof in arbitrary ratio.

Also, as the particulate polymer beside the above mentioned, vinyl based polymers such as polyethylene, polypropylene, polyisobutylene, polyvinyl chloride, polyvinylidene chloride, polyvinyl acetate, polyvinyl alcohol, polyvinyl isobutyl ether, polyacronitrile, polymethacrylonitrile, polymethylmethacrylate, polymethylacrylate, polyethylmethacrylate, allyl acetate, polystyrene or so; ether based polymers containing hetero atom in the main chain such as polyoxymethylene, polyoxyethylene, polycyclicthioether, polydimethylsiloxane or so; the condensed ester based polymers such as polylactone, polycyclic anhydride, polyethylene terephthalate, polycarbonate or so; condensed amide type polymer such as nylon 6, nylon 66, poly-m-phenylisophthalamide, poly-p-phenyleneterephthalamide, polypyromellitimide or so may be mentioned.

The particulate polymers A and B may be those which can maintain or exist in the particle shape in the adhesive layer. Here, "the state of remaining the particle shape" does not have to be a state where it has maintained a complete particle shape, but it only needs to maintain some level of particle shape thereof. As for the particulate polymer, for example, those wherein the particle of the polymer such as latex or so being dispersed in a water, or the powder obtained by drying such dispersion may be mentioned.

(The Method for Producing the Separator with the Adhesive Layer)

The separator with the adhesive layer is obtained by forming the adhesive layer comprising the aforementioned particulate polymers A and B on one side or both sides of the aforementioned porous polyolefin film. Though, the method for forming the adhesive film is not particularly limited, it is easy to use the method of coating the aqueous dispersion slurry for the adhesive layer regulated to have predetermined viscosity comprising the particulate polymers A and B on one side or both sides of the porous polyolefin film, and then drying thereof is easy; and it is also preferable from the working hygiene condition.

The particulate polymers A and B are, in may cases, obtained in the form of latex wherein the particulate polymer is dispersed in the aqueous solvent, hence the production is easy if it is a aqueous dispersion slurry which does not need solvent substitution, and it is also preferable from the point of working hygiene condition as the organic solvent is not used. The viscosity of the aqueous dispersion slurry for the adhesive layer is preferably 0.001 to 0.1 Pa·s, more preferably 0.05 to 0.08 Pa·s, and particularly preferably 0.01 to 0.05 Pa·s. Note that, the slurry viscosity is the value measured based on JIS K 7117-1; 1999 using B-type viscometer (RB-80L made by TOKI SANGYO CO., LTD) at 25° C. with a revolution of 60 rpm. By having the viscosity of the aqueous dispersion slurry for the adhesive layer within the above mentioned range, the adhesive layer having thin and uniform thickness can be produced efficiently.

The solid concentration of the aqueous dispersion slurry for the adhesive layer is preferably 1 to 20 wt %, more preferably 1 to 15 wt %, and particularly preferably 1 to 10 wt %. If the solid concentration is too low, the slurry viscosity declines, and the adhesive layer with necessary thickness becomes difficult to obtain, and also if the solid concentration is too high, the slurry viscosity will become high, and it will become difficult to coat a thin layer.

The aqueous dispersion slurry for the adhesive layer may include with other components in addition to the particulate polymers A and B. As other components, the dispersant or surfactant used when producing the particulate polymer, the viscosity regulator and thickener for regulating the viscosity of the aqueous dispersion for the adhesive layer, the moisturizer for supplying the moist to the adhesive layer of after drying or so may be included.

The aqueous dispersion slurry for the adhesive layer is produced by mixing the particulate polymer A, the particulate polymer B, water, and above mentioned other component depending on the needs. As the mixing device, a ball mill, a sand mill, a pigment dispersing machine, an ultrasonic dispersion machine, a homogenizer, a planetary mixer or so may be mentioned.

The total ratio of the particulate polymer A and the particulate polymer B in the total solid portion of the aqueous dispersion slurry for the adhesive layer is preferably 70 wt % or more, and more preferably 80 wt % or more. If the total ratio of the particulate polymer A and the particulate polymer B in the total solid portion of the aqueous dispersion slurry for the adhesive layer is less than the above mentioned range, then a necessary adhesiveness may not be obtained.

The method of coating the aqueous dispersion slurry for the adhesive layer is not particularly limited, and for example, it may be coated by a doctor blade method, a dip method, a reverse roll method, a direct roll method, a gravure method, an extrusion method or a brush method or so.

As the method for drying, for example, the drying by a warm air, a hot air, a low moisture air, a vacuum drying, a drying by an irradiation of (far) infrared ray or electron beam or so may be mentioned. The drying time is usually 5 to 30 minutes, and the drying temperature is usually 40 to 180° C.

(The Method for Producing the Electrode/Separator Laminate)

In the present invention, the electrode/separator laminate is obtained by carrying out the thermocompression bonding of the above mentioned separator with the adhesive layer and the electrode. The separator with the adhesive layer may comprise the adhesive layer on the both sides, or it may comprise the adhesive layer only on one side.

The electrode is the positive electrode and the negative electrode of the lithium ion secondary battery, and usually it is formed by forming the electrode active material layer on the metal foil called the current collector. The electrode active material layer comprises the electrode active material and the electrode binder. As the electrode active material and the electrode binder, various electrode active materials and the electrode binder usually used in the lithium ion secondary battery can be used without any particular limitation.

In the present invention, from the point of further improving the adhesiveness between the electrode and the separator, as the electrode binder, it is preferable to comprise the particulate polymer having the glass transition temperature of −50 to 5° C. Note that, the particulate polymer included in the electrode binder may be same or different of the particulate polymer A. Also, the electrode binder may be constituted only from the particulate polymer having the glass transition temperature of −50 to 5° C., or it may be mixture of said particulate polymer and other binder, or it may be constituted only from the binder other than the particulate polymer. The particulate polymer having the glass transition temperature of −50 to 5° C. may be used for the positive electrode active material layer or the negative electrode active material layer, or it may be used for both.

When producing the electrode/separator laminate, the separator with the adhesive layer and the electrode are laminated so that said adhesive layer and said electrode active material layer are in contact, then the thermocompression bonding is carried out.

The thermocompression bonding temperature is usually 50 to 100° C., preferably 50 to 90° C., and more preferably 60 to 90° C. By having the thermocompression bonding temperature within this range, the electrode and the separator can be adhered with a sufficient strength, and the pores of the separator will not be covered. On the other hand, if the thermocompression bonding temperature is too high, even though the adhesive strength is enhanced, the pores are covered as the particulate polymer and other solid portion infiltrates to the pores of the separator, as a result, the ionic conductivity may be compromised. Also, if the thermocompression bonding temperature is too low, a sufficient adhesive strength cannot be obtained, and the cycle characteristic may be compromised.

Also, the pressure of the thermocompression bonding is preferably 0.01 to 5 MPa, more preferably 0.5 to 3 MPa; and the compression bonding time is preferably 10 seconds to 5 minutes, and more preferably 1 to 3 minutes or so. If the pressure of the thermocompression bonding is too high or the compression bonding time is too long, the pores are covered as the particulate polymer and other solid portion infiltrates to the pores of the separator, as a result the ionic conductivity may be compromised even though the adhesiveness is enhanced. If the pressure of the thermocompression bonding is too low, or the compression bonding time is too short, a sufficient adhesive strength cannot be obtained, and the cycle characteristic of the lithium ion secondary battery may be compromised.

(The Positive Electrode and the Negative Electrode)

The positive electrode and the negative electrode are not particularly limited, and various constitution used for the lithium ion secondary battery can be used. In general, it is formed by adhering the electrode active material layer comprising the electrode active material as the essential component to the current collector.

The positive electrode and the negative electrode used in the secondary battery of the present invention (hereinafter, it may be referred as "the secondary battery electrode") is formed by stacking the current collector and the electrode active material layer; and the conductive adhesive layer may be formed between the current collector and the electrode active material layer. Also, the electrode active material layer comprises the electrode active material and the electrode binder.

(The Electrode Active Material)

The electrode active material used for the lithium ion secondary battery only needs to be those which can absorb and release the lithium ion reversibly by applying the electrical potential in the electrolytic solution, and inorganic compound or organic compound may be used.

The electrode active material of the (the positive active material) for the positive electrode of the lithium ion secondary battery is largely separated to those made of inorganic compound and the organic compound. As the positive electrode active material made of an inorganic material, a transition metal oxide, a composite oxide of lithium and the transition metal, and the transition metal sulfide or so may be mentioned. As for the above mentioned transition metal, Fe, Co, Ni, Mn or so may be used. As for the specific examples of the inorganic compounds used as the positive electrode active material, lithium containing composite metal oxide such as $LiCoO_2$, $LiNiO_2$, $LiMnO_2$, $LiMn_2O_4$, $LiFePO_4$, $LiFeVO_4$ or so; the transition metal sulfide such as $TiS_2$, $TiS_3$, amorphous $MoS_2$ or so; the transition metal oxide such as $Cu_2V_2O_3$, amorphous $V_2O$—$P_2O_5$, $MoO_3$, $V_2O_5$, $V_6O_{13}$ or so may be mentioned. These compounds may be partially substituted with other elements. As for the positive electrode active material made of the organic compound, a conductive polymer such as polyacetylene and poly-p-phenylene or so can be used. An iron-based oxide, poor in electric conductivity can be used as an electrode active material coated with carbon material by carrying out the reduction firing in the presence of the source of carbon. Also, these compounds may partially be element substituted.

The positive electrode active material may be a mixture of above mentioned inorganic compound and the organic compound. The particle diameter of the positive electrode active material is appropriately selected depending on arbitrary constituting elements of the battery, however from the point of improving the battery characteristics such as rate characteristic, cycle characteristics or so, the 50% volume cumulative diameter is usually 0.1 to 50 μm and preferably 1 to 20 μm. When 50% volume cumulative diameter is within said range, the secondary battery having large charge-discharge capacity can be obtained; and the handling during the production of the electrode slurry and the electrode becomes easy. The 50% volume cumulative diameter can be obtained by measuring the particle distribution using laser diffraction.

As for the electrode active material for the lithium ion secondary battery (the negative electrode active material), for example, carbon materials such as amorphous carbon, graphite, natural graphite, artificial graphite, mesocarbon microbeads, pitch type carbon materials or so; the conductive polymer compound such as polyacene or so may be mentioned. Also, as the negative electrode active material, a metal such as silicon, tin, zinc, manganese, iron and nickel, the alloy thereof, oxide and sulfate of the above metal or alloy can be used. In addition, metal lithium, lithium alloy such as Li—Al, Li—Bi—Cd and Li—Sn—Cd or so, nitride of lithium-transition metal, silicone or so can be used as well. The electrode active material in which a conductivity providing agent is adhered to its surface by mechanical reforming process can also be used. The particle size of the negative electrode active material can properly selected depending on the other battery requirements, in view of improvement in battery characteristics such as initial efficiency, rate characteristic and cycle characteristic or so, the 50% volume cumulative diameter is normally 1 to 50 μm, preferably 15 to 30 μm.

(The Electrode Binder)

In the present invention, the electrode active material layer may include binder (hereinafter, it may be referred as "electrode binder") besides the electrode active material. By including the electrode binder, the binding property of the electrode active material layer in the electrode improves, and the strength against the mechanical force applied during the winding step of the electrode will increase, and also the electrode active material layer in the electrode is less likely to fall off, thus the risk of short circuit due to the fallen object can be reduced.

Various resin components can be used for the electrode binder. For example, polyethylene, polytetrafluoroethylene (PTFE), polyvinylidene fluoride (PVDF), tetrafluoroethylene-hexafluoropropylene copolymer (FEP), polyacrylic acid derivative or so can be used. These may be used alone or in combination of two or more.

Furthermore, the soft polymer exemplified as below can be used as the binder.

Acrylic soft polymer which is a homopolymer of acrylic acid or methacrylic acid derivative or a copolymer thereof with its copolymerizable monomer, such as polybutyl acrylate, polybutyl methacrylate, polyhydroxymethyl methacrylate, polyacrylamide, butyl acrylate-styrene copolymer, butyl acrylate-acrylic nitrile copolymer and butyl acrylate-acrylonitrile-glycidyl methacrylate copolymer or so;

Isobutylene based soft polymer such as polyisobutylene, isobutylene-isoprene rubber and isobutylene-styrene copolymer or so;

diene based soft polymer such as polybutadiene, polyisoprene, butadiene-styrene random copolymer, isoprene-styrene random copolymer, acrylonitrile-butadiene copolymer, acrylonitrile-butadiene-styrene copolymer, butadiene-styrene-block copolymer, styrene-butadiene-styrene-block copolymer, isoprene-styrene-block copolymer and styrene-isoprene-styrene-block copolymer or so;

silicon containing soft polymer such as dimethyl polysiloxane, diphenyl polysiloxane and dihydroxy polysiloxane or so;

olefin based soft polymer such as liquid polyethylene, polypropylene, poly-1-butene, ethylene-α-olefin copolymer, propylene-α-olefin copolymer, ethylene-propylene-diene copolymer (EPDM) and ethylene-propylene-styrene copolymer or so;

vinyl based soft polymer such as polyvinyl alcohol, polyvinyl acetate, polyvinyl stearate and vinyl acetate-styrene copolymer or so;

epoxy based soft polymer such as polyethylene oxide, polypropylene oxide and epichlorohydrin rubber or so;

fluorine containing soft polymer such as vinylidene fluoride based rubber and ethylene tetrafluoride-propylene rubber;

other soft polymer such as natural rubber, polypeptide, protein, polyester based thermoplastic elastomer, vinyl chloride based thermoplastic elastomer and polyamide based thermoplastic elastomer or so may be mentioned. These soft polymers may be those with a crosslinked structure, and those having a functional group introduced by denaturalization.

Also, as mentioned in above, it is particularly preferable that the electrode binder includes the particulate polymer having the glass transition temperature of −50 to 5° C. The number average particle diameter of said particulate polymer is preferably 50 μm or more, more preferably 70 μm or more, and preferably 500 μm or less and more preferably 400 μm or less.

The amount of the electrode binder in the electrode active material layer is preferably 0.1 to 5 parts by weight, more preferably 0.2 to 4 parts by weight and particularly preferably 0.5 to 3 parts by weight with respect to 100 parts by weight of the electrode active material. By having the amount of the electrode binder in the electrode active material layer within said range, the electrode active material can be prevented from falling off from the electrode without interrupting the battery reaction.

The binder is prepared as a solution or dispersant fluid for producing an electrode. The viscosity at the preparation is normally in the range of 1 mPa·s to 300,000 mPa·s, preferably 50 mPa·s to 10,000 mPa·s. The viscosity is measured at 25° C. with a rotational speed of 60 rpm using B-type viscometer.

(Arbitrary Additives)

In the electrode active material layer, besides the above mentioned electrode active material and the electrode binder, arbitrary additives such as conductivity providing agent or reinforcing material or so may be included. As the conductivity providing agent, conductive carbon such as acetylene black, Ketjen black, carbon black, graphite, vapor-grown carbon fiber and carbon nanotube or so can be used. Also, carbon power such as black lead, fiber or foil of a variety of metals or so can be used as well. As a reinforcing material, a variety of inorganic and organic fillers having spherical shape, sheet shape, rod shape or fibrous shape can be used. By using the conductivity providing agent, it is possible to improve electrical contact between the electrode active materials, and to improve discharge rate characteristic when used in a lithium ion secondary battery. The used amount of the conductivity providing agent and the reinforcing material is normally 0 to 20 parts by weight, preferably 1 to 10 parts by weight with respect to 100 parts by weight of the electrode active material. Also, within the range which does not compromise the effect of the present invention, isothiazoline based compound or chelate compound may be included in the electrode active material layer.

(The Method for Producing the Secondary Battery Electrode)

The secondary battery is formed by forming the electrode active material layer on the current collector. The electrode active material layer can be formed by adhering the slurry (hereinafter, it may be referred as "electrode slurry") comprising the electrode active material, the electrode binder, and the solvent to the current collector.

As the solvent, it may be those which dissolve the electrode binder, or those disperse the electrode binder in a particle form; however it is preferable to use those which dissolve. By using the solvent which dissolves the electrode binder, the electrode active material will be stably dispersed as the electrode binder adheres to the surface of the electrode active material or the arbitrary additives.

As the solvent used for the electrode slurry, either water or organic solvent can be used. The organic solvent may include cyclic aliphatic hydrocarbons such as cyclopentane and cyclohexane or so; aromatic hydrocarbons such as toluene and xylene or so; ketones such as ethyl methyl ketone and cyclohexanone or so; esters such as ethyl acetate, butyl acetate, γ-butyrolactone and ε-caprolactone or so; alkylnitriles such as acetonitrile and propionitrile or so; ethers such as tetrahydrofuran and ethylene glycol diethyl ether or so; alcohols such as methanol, ethanol, isopropanol, ethylene glycol and ethylene glycol monomethyl ether or so; amides such as N-methyl pyrrolidone and N,N-dimethyl formamide or so may be mentioned. These solvents can be used alone or in mixture of 2 or more, and by properly selecting depending on the drying speed and the environments.

The electrode slurry may further contain additives having a variety of functions such as thickener or so. As the thickener, polymer soluble in the organic solvent used in the electrode slurry can be used. The used amount of the thickener is 0.5 to 1.5 parts by weight with respect to 100 parts by weight of the electrode active material. When the used amount of the thickener is within the above mentioned range, excellent coating property of the electrode slurry, and the excellent adhesiveness with the current collector can be exhibited.

Further, in the electrode slurry, besides the above mentioned components, in order to enhance the stability and the lifetime of the battery, trifluoropropylene carbonate, vinylene carbonate, catechol carbonate, 1,6-dioxaspiro[4,4]nonane-2,7-dione, 12-crown-4-ether or so can be used. Also, these may be used to the electrolytic solution which will be described in the following.

The amount of the solvent in the electrode slurry may be adjusted for use depending on the types of the electrode active material, the electrode binder or so, so as to have viscosity preferable for coating. Specifically, the amount can be adjusted for use such that the concentration of combined solid portion of the electrode active material, electrode binder and arbitrary additives is preferably 30 to 90 wt %, more preferably 40 to 80 wt %.

The electrode slurry is obtained by mixing the electrode active material, the electrode binder, the arbitrary additives such as conductivity providing agent which is added depending on the needs and the solvent using the mixing device. Mixing may be done by providing each of the above components into the mixing machine at once. When the electrode active material, the electrode binder, the conductivity providing agent and the thickener are used as constituting components for the electrode slurry since the dispersibility of the slurry can be improved, it is preferable that the conductivity providing agent and thickener are mixed in the solvent to disperse the conductivity providing agent to fine particles, followed by adding the electrode binder and electrode active material for further mixing. For the mixing machine, ball mill, sand mill, pigment dispersing machine, stone mill, ultrasonic dispersing machine, homogenizer, planetary mixer, Hobart mixer or so can be used, and it is preferable to use the ball mill because aggregation of the conductivity providing agent and electrode active material can be inhibited.

The particle size of the electrode slurry is preferably 35 μm or less; further preferably 25 μm or less. When the particle size of the slurry is within the above range, dispersibility of the conductivity providing agent is high, and uniform electrode can be obtained.

The current collector is not particularly limited as long as it is a material having electric conductivity and electrochemical durability, and for example, metal materials such as iron, copper, aluminum, nickel, stainless steel, titanium, tantalum, gold and platinum or so are preferable in view of their heat resistance. Among these, aluminum is particularly preferable for the positive electrode of the lithium ion secondary battery and copper is particularly preferable for the negative electrode of the lithium ion secondary battery. The shape of the current collector is not particularly limited, and the sheet shaped collector having a thickness of about 0.001 to 0.5 mm or so is preferable. It is preferable that the current collector is used by carrying out the roughening treatment in advance in order to increase the adhesive strength of the electrode active material layer. Method of the roughening treatment may include mechanical polishing, electropolishing, chemical polishing or so. As the mechanical polishing, the coated abrasive having fixed abrasive particles, the grinding stone, the emery buff, the wire-brush provided with steel wire and or so can be used. Also, an intermediate layer may be formed on the surface of the current collector to increase the adhering strength and conductivity of the electrode active material layer.

The method for producing the electrode active material layer may be the method of binding the electrode active material layer to one side or preferably both sides of said current collector. For example, the electrode slurry is coated on the current collector, dried, and then, heat applying treatment is carried out at 120° C. or more for 1 hour or more to form the electrode active material layer. The method for coating the electrode slurry onto the current collector is not particularly limited. For example, doctor blade method, dip method, reverse roll method, direct roll method, gravure method, extrusion method, brush method or so may be mentioned. As the drying method, for example, drying by warm air, hot air or low wet air, vacuum drying, drying method with irradiation of (far-) infrared rays, electron beam or so may be mentioned.

Then, it is preferable to lower the porosity of the electrode active material layer of the electrode by pressure treatment with mold press, roll press or so. The preferable range of the porosity is 5% to 15%, more preferably 7% to 13%. If the porosity is too high, the charging efficiency or the discharging efficiency may deteriorate. If the porosity is too low, high volume capacity may be difficult to obtain, or malfunction may easily occur since the electrode active material layer tends to easily fall off from the current collector. Further, if the curable polymer is used, it is preferable to cure.

The thickness of the electrode active material layer is, for both positive electrode and negative electrode, normally 5 to 300 μm, preferably 10 to 250 μm.

(Lithium Ion Secondary Battery)

The lithium ion secondary battery according to the present invention comprises the above mentioned electrode/separator laminate, and the non-aqueous electrolytic solution.

(Non-Aqueous Electrolytic Solution)

As the non-aqueous electrolytic solution, it is not particularly limited, and those dissolving the lithium salt as the supporting electrolytes in the non-aqueous solvent can be used. As the lithium salt, for example, $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2F_5SO_2)NLi$ or so may be mentioned. Among these, $LiPF_6$, $LiClO_4$, $CF_3SO_3Li$, which easily dissolves in the solvent and has high degree of dissociation, are preferable. These may be used alone, or by mixing two or more thereof. The amount of the supporting electrolyte is usually 1 wt % or more, more preferably 5 wt % or more, and usually 30 wt % or less and more preferably 20 wt % or less. The ionic conductivity will be compromised, and the charging characteristic and discharging characteristic of the batter will decline, if the amount of the supporting electrolytes are too small or too much.

The solvent used for the electrolytic solution is not particularly limited, as long as it dissolves the supporting electrolyte, and usually alkyl carbonates such as dimethyl carbonate (DMC), ethylene carbonate (EC), diethyl carbonate (DEC), propylene carbonate (PC), butylene carbonate (BC), methylethyl carbonate (MEC) or so; esters such as γ-butyrolactone, methyl formate or so; ethers such as 1,2-dimethoxyethane, tetrahydrofuran or so; sulfur containing compounds such as sulfolane, dimethylsulfoxide or so may be preferably used. Dimethyl carbonate, ethylene carbonate, propylene carbonate, diethyl carbonate and methylethyl carbonate are preferable, since high ionic conductivity can be easily obtained, and the using temperature range is wide. These may be used alone, or by mixing two or more thereof.

As for the electrolytic solution besides the above mentioned, gel form polymer electrolytes wherein the polymer electrolytes such as polyethyleneoxide and polyacrylonitrile or so are immersed in the electrolytic solution, or inorganic solid electrolytes such s lithium sulfide, LiL, $Li_3N$ or so may be mentioned.

Also, the electrolytic solution may comprise the additive for use. As for the additives, besides the carbonate based compound such as vinylene carbonate (VC), fluorine containing carbonate such as fluoroethylene carbonate or so, ethylmethyl sulfone or so are preferable. Among these, fluorine based electrolytic solution additives have high voltage resistance. The above mentioned fluorine based electrolytic solution additives such as fluorine containing carbonate may be blended into the electrolytic solution, since the electrolytic solution made of ethylene carbonate or propylene carbonate may not withstand the high voltage and may decompose as the capacity has become larger and the voltage during the charge-discharge has become high.

The method for producing the lithium ion secondary battery of the present invention is not particularly limited. For example, the aforementioned electrode/separator laminate may be wound, folded or so depending on the shape of the battery, and then placed in a battery case, followed by introducing the electrolytic solution into the battery case and seal. Further, if necessary, expanded metal, an overcurrent prevention element such as a fuse and a PTC element, a lead plate or so may also be placed, to prevent an increase of the internal pressure in the battery, and to prevent overcharge/discharge. The shape of the battery may be any of a laminate cell type, coin type, button type, sheet type, cylinder type, horn shape, and flat type. Particularly, according to the present invention, the bonding strength between the electrode and the separator is high, hence the adhesive layer between the electrode/separator will not be damaged even when it is bent, and thus it is suitable for the production of the winding type ouch cell.

EXAMPLE

Hereinafter, the present invention will be described based on the examples, however the present invention is not be limited thereto. Note that, parts and % in the present examples are based on the weight unless mentioned otherwise. In the examples and the comparative examples, various physical properties are evaluated as following.

[The Glass Transition Temperature of the Particulate Polymer]

The temperature was measured using the differential scanning calorimetry at the temperature rising speed of 10° C./min, then the intersection between the tangent lines of the measured base line and the inflection point (the point where the upwards convex curve changes to downward concave curve) was determined as the glass transition point (Tg).

[The Average Thickness of the Adhesive Layer]

The average thickness of the adhesive layer was determined as the difference between the average thickness of the separator with the adhesive layer, and the average thickness of the porous polyolefin film. The average thickness was measured for each of the porous polyolefin film and the separator with adhesive layer using high accuracy film thickness measuring device (made by TOSEI ENGINEERING CORP.), then average value was taken from five measuring points. Note that, in case the adhesive layer was formed on both sides of the porous polyolefin film, the average value of both sides respectively is divided by two thereby the average thickness was obtained.

[The Permeability of the Separator for the Secondary Battery]

The test specimen was obtained by cutting the separator with adhesive layer into a size of width 5 cm×length 5 cm. Then, for this test specimen, Gurley value (sec/100 cc) was measured using Gurley measurement apparatus (SMOOTH & POROSITY METER (measuring diameter: ϕ2.9 cm) made by KUMAGAI RIKI KOGYO Co., Ltd.), thereby the permeability X of the separator with the adhesive layer before the thermocompression bonding was determined.

The separator with adhesive layer cutout in square of width 5 cm×length 5 cm, and the release film (product name "PET38AL-5" made by Lintec Corporation) cut out in a square of width 3 cm×length 3 cm were stacked against each other, then it was pressed for 2 minutes under the condition of 80° C. and 1 MPa. Then, the release film was peeled off, and for the separator with adhesive layer of after being peeled off, the Gurley value was measured by the same method described in above, thereby the permeability Y of the separator with the adhesive layer of after the thermocompression bonding was determined. Note that, the Gurley value was used as the substitute of the ionic conductivity.

[The Electrode Adhesiveness of the Separator for the Secondary Battery]

The separator with adhesive layer cutout in square of width 5 cm×length 5 cm and the negative electrode plate cut out in a square of width 3 cm×length 3 cm were stacked against each other, then it was pressed for 2 minutes under the condition of 80° C. and 1 MPa, thereby the laminate was obtained. The obtained laminate was cut out into a parallelepiped shape of width 1 cm×length 5 cm to make a test specimen, then the negative electro plate side was fixed using a scotch tape (those defined by JIS Z1522) on the testing table of the peel tester. Then, the stress when one end of the separator pulled towards 180 degrees direction at the tensile speed of 50 mm/min for peeling was measured. The measurements were carried out for three times, and the average values were determined, then evaluated based on the following standard. The larger the stress is, the higher the adhesiveness between the electrode is.

A: The stress is 0.15 N/m or more.
B: The stress is less than 0.15 N/m.

[The Rate Characteristic of the Battery]

The charge-discharge cycle of wherein 10 cells of the full-cell coin shape battery was charged up to 4.2 V by the constant current method of 0.1 C and 25° C., then discharged to 3.0 V by the constant current method of 0.1 C; and the charge-discharge cycle wherein charging up to 4.2 V by the constant current method of 0.2 C and 25° C., then discharged to 3.0 V by the constant current method of 1.0 C, were each carried out for one (1) cycle. The ratio of the discharge capacity at 1.0 C against the discharge capacity at 0.1 C was calculated in a percentile (=(the discharge capacity at 1.0 C)/(the discharge capacity at 1.0 C)×100) thereby the charge-discharge rate characteristic was determined, and it was evaluated based on the following standard. The larger this value is, the smaller the internal resistance is, and hence it indicates that high speed charge-discharge is possible.

A: The charge-discharge rate characteristic is 80% or more.
B: The charge-discharge rate characteristic is 75% or more and less than 80%.
C: The charge-discharge rate characteristic is 70% or more and less than 75%.
D: The charge-discharge rate characteristic is less than 70%.

[The High Temperature Cycle Characteristic of the Battery]

Under the atmosphere of 60° C., 10 cells of the full-cell coin shape battery was charged up to 4.2 V by the constant current method of 0.1 C and 25° C., then discharged to 3.0 V, and this charge-discharge was carried out for 50 times (50 cycles) to measure the battery capacity. The average value of 10 cells was defined as the measured value. Further, the ratio of the battery capacity after completing 5 cycles with respect to that of 50 cycles were calculated in a percentile (=(the battery capacity after completing 50 cycles)/(the battery capacity after completing 5 cycles)×100) thereby the charge-discharge capacity maintaining rate was obtained, and this was set as the evaluation standard of the cycle characteristic. The higher this value is, the more excellent the high temperature cycle characteristic is.

A: The charge-discharge capacity maintaining rate is 80% or more.
B: The charge-discharge capacity maintaining rate is 70% or more and less than 80%.
C: The charge-discharge capacity maintaining rate is 60% or more and less than 70%.
D: The charge-discharge capacity maintaining rate is less than 60%.

[The Electrolytic Solution Swelling Ratio of the Particulate Polymer]

Each of the aqueous dispersion of the particulate polymer was casted on the polytetrafluoroethylene sheet so that the thickness after the drying was 1 mm, and the casted film was obtained by drying. This casted film was cut into a size of 2 cm×2 cm and weighed (the weight A before immersing), then it was immersed in the electrolytic solution of 60° C. for 72 hours. The immersed film was pulled out, and wiped by a towel paper and weighed (the weight B after immersing). The electrolytic solution swelling ratio of the binder was calculated from the following formula.

Note that, as for the electrolytic solution, the solution wherein $LiPF_6$ dissolved in a concentration of 1 mol/litter in the mixed solvent which is the mixture of ethylenecarbonate (EC) and diethylcarbonate (DEC) of EC/DEC=1/2 (the capacity ratio at 20° C.) was used.

$$\text{The swelling ratio(times)} = B/A \times 100(\%)$$

Example 1

(1-1. The Production of the Particulate Polymer A)

To the reactor equipped with the stirrer, 70 parts of ion exchange water, 0.15 parts of sodium lauryl sulfate ("EMAL 2F" made by Kao Corporation) as emulsifier, and 0.5 parts of ammonium persulfate were supplied, and the vapor part was substituted with nitrogen gas, further the temperature was raised to 60° C.

On the other hand, in other container, 50 parts of ion exchange water, 0.5 parts of sodium dodecylbenzenesulfonate, 94.8 parts of butyl acrylate as the polymerizable monomer, 2 parts of acrylonitrile, 2 parts of methacrylic acid, 1.2 parts of N-methylol acrylamide were mixed, thereby the monomer mixture was obtained. This monomer mixture was continuously added to said reactor using 4 hours, thereby the polymerization was carried out. During the addition, the reaction was carried out at 60° C. After completing the addition, it was stirred for 3 hours at 70° C. and the reaction was terminated, thereby the aqueous dispersion of the particulate polymer A1 was produced.

The number average particle diameter of the obtained particulate polymer A1 was 0.36 μm, and the glass transition temperature was −38° C. Also, in regards with the obtained particulate polymer A1, the electrolytic solution swelling ratio was measured. The result is shown in Table 1.

(1-2. The Production of the Particulate Polymer B1)

To the reactor equipped with the stirrer, 70 parts of ion exchange water, 0.15 parts of sodium lauryl sulfate ("EMAL 2F" made by Kao Corporation) as emulsifier, and 0.5 parts of ammonium persulfate were supplied, and the vapor part was substituted with nitrogen gas, further the temperature was raised to 70° C.

On the other hand, in other container, 50 parts of ion exchange water, 0.5 parts of sodium dodecylbenzenesulfonate, 80 parts of styrene and 18 parts of butyl acrylate as the polymerizable monomer, 2 parts of acrylonitrile, 2 parts of methacrylic acid, 1.2 parts of acrylamide were mixed, thereby the monomer mixture was obtained. This monomer mixture was continuously added to said reactor using 3 hours, thereby the polymerization was carried out. During the addition, the reaction was carried out at 70° C. After completing the addition, it was stirred for 3 hours at 70° C. and the reaction was terminated, thereby the aqueous dispersion of the particulate polymer B1 was produced.

The number average particle diameter of the obtained particulate polymer B1 was 0.35 μm, and the glass transition temperature was 72° C. Also, in regards with the obtained particulate polymer B1, the electrolytic solution swelling ratio was measured. The result is shown in Table 1.

(1-3. The Production of the Slurry for the Adhesive Layer)

The aqueous dispersion of the particulate polymer A1 obtained in the above step (1-1), and the aqueous dispersion of the particulate polymer B1 obtained in the above step (1-2) were mixed in the water using the impeller stirrer so that the solid weight ratio (A1/B1) is 15/85; then the lubricant (the product name: SN wet 980 made by SAN NOPCO LIMITED) was mixed so that the solid ratio was 5 parts with respect to 100 parts of total solid portion of the particulate polymer A1 and the particulate B1. Then, the aqueous slurry for the adhesive layer was obtained by diluting with the ion exchange water so that the total solid concentration of the particulate polymer A1, the particulate polymer B1 and the lubricant was 3 wt %.

The weight ratio of the particulate polymer A1/the particulate polymer B1/the lubricant of the total solid portion in the slurry for the adhesive layer was 14.29/80.95/4.76. The viscosity of the aqueous dispersion slurry for the adhesive layer was 0.01 Pa·s.

(1-4. The Production of the Separator with the Adhesive Layer)

As the porous polyolefin film, the porous polyethylene film (the thickness of 16 μm, the Gurley value of 147 sec/100 cc) was prepared. To one side of the porous polyethylene film prepared, the aqueous slurry for the adhesive layer was coated, and dried at 50° C. for 10 minutes. Then, to other side of the porous polyethylene film, it was coated in a similar manner; thereby the separator with the adhesive layer comprising the adhesive layer on both sides of the porous polyethylene film was obtained. The average thickness of one side of the adhesive layer of obtained separator was 0.8 μm. For the obtained separator, the evaluation of the permeability, and the evaluation of the electrode adhesiveness with the below described negative electrode were carried out. The results are shown in Table 2.

(1-5. The Production of the Positive Electrode)

To 95 parts of $LiCoO_2$ as the positive electrode active material, 3 parts of PVDF (polyvinilydene fluoride, product name: KF-1100 made by KUREHA CORPORATION) as the binder was added; then 2 parts of acetylene black and 20 parts of N-methylpyrrolidone (hereinafter, it may be referred as NMP) were further added, and these were mixed by planetary mixer, thereby the slurry for the positive electrode was obtained. This slurry for the positive electrode was coated on one side of the aluminum foil having the thickness of 18 μm, then dried for 3 hours at 120° C., thereby the positive electrode comprising the positive electrode active material layer having the total thickness of 100 μm by carrying out the roll press was obtained.

(1-6. The Production of the Negative Electrode)

100 parts of graphite having 20 μm of the 50% volume cumulative diameter and the specific surface area of 4.2 $m^2/g$ as the negative electrode active material, and 1 part of solid portion conversion amount of aqueous dispersion of SBR (styrene-butadiene rubber, the glass transition temperature: −10° C., and the numerical average particle diameter of 150 nm) were mixed, and 1.0 part of carboxymethyl cellulose were further mixed to this mixture, then the water is added as the solvent to mix these using planetary mixer; thereby the negative electrode slurry was obtained. This negative electrode slurry was coated on one side of the copper foil having the thickness of 18 μm, then dried for 3 hours at 120° C., thereby the negative electrode comprising the negative electrode active material layer having the total thickness of 60 μm by carrying out the roll press was obtained.

(1-7. The Production of the Battery)

The above obtained positive electrode was cut out in 4.3 cm (including the non-coated part of 1.5 cm)×3.8 cm, thereby the parallelepiped positive electrode was obtained. The above obtained negative electrode was cut out in 4.5 cm (including the non-coated part of 1.5 cm)×4.0 cm, thereby the parallelepiped negative electrode was obtained. Also, the above obtained separator with the adhesive layer was cut out in 3.5 cm×4.5 cm, thereby the parallelepiped separator with the adhesive layer was obtained.

The positive electrode layer was placed along the surface of the parallelepiped separator with the adhesive layer, and also the negative electrode active material layer was placed along the backside thereof, then heat and pressure were applied for 2 minutes at the temperature of 80° C. and the pressure of 1 MPa, and the positive electrode and the negative electrode were carried out with the compression bonding to the separator with the adhesive layer, thereby the negative electrode/the separator with the adhesive layer/the positive electrode laminate was produced.

Then, the aluminum wrapping material cut out in the parallelepiped shape of 18 cm×9 cm was folded in 9 cm×9 cm, then at inside thereof, the negative electrode/the separator with the adhesive layer/the positive electrode laminate was placed; then two parts of the both ends of the aluminum wrapping material was thermally bonded by the heat sealer of 150° C.; then these were fixed, thereby the negative electrode/the separator with the adhesive layer/the positive electrode laminate/aluminum wrapping material container were produced.

To the above obtained negative electrode/the separator with the adhesive layer/the positive electrode laminate/aluminum wrapping material container, the electrolytic solution was introduced so that no air is left, then the container was sealed by thermal bonding using the heat sealer of 150° C.; thereby lithium ion secondary battery (laminate cell) of 9 cm×9 cm was produced. As for the electrolytic solution, the solution wherein $LiPF_6$ dissolved in a concentration of 1 mol/litter in the mixed solvent which is the mixture of ethylene carbonate (EC) and diethyl carbonate (DEC) of EC/DEC=1/2 (the capacity ratio at 20° C.) was used. For the obtained batter, the rate characteristic and the high temperature cycle characteristic were measured. The result is shown in Table 2.

(The Production of the Particulate Polymers A2-A4, A6-A8, B2-B4, B6 and B7)

The particulate polymers A2-A4, A6-A8, B2-B4, B6 and B7 were obtained by changing the type of the monomer, the used amount, the amount of the emulsifier, and the amount of sodium dodecyl benzene sulfonate as shown in Table 1, of the step (1-1) or step (1-2) of the example 1.

(The Production of the Particulate Polymer A5)

To the reactor equipped with the stirrer, 10 parts in the solid base (that is, the weight base of the particulate polymer A1) of the aqueous dispersion of the particulate polymer A1 obtained in the above step (1-1), 0.15 parts of sodium lauryl sulfate ("EMAL 2F" made by Kao Corporation) as emulsifier, and 0.5 parts of ammonium persulfate were supplied, and the vapor part was substituted with nitrogen gas, further the temperature was raised to 60° C.

On the other hand, in other container, 50 parts of ion exchange water, 0.5 parts of sodium dodecylbenzenesulfonate, 94.8 parts of butyl acrylate as the polymerizable monomer, 2 parts of acrylonitrile, 2 parts of methacrylic acid, 1.2 parts of N-methylol acrylamide were mixed, thereby the monomer mixture was obtained. This monomer mixture was continuously added to said reactor using 4 hours; thereby the polymerization was carried out. During the addition, the reaction was carried out at 60° C. After completing the addition, it was stirred for 3 hours at 70° C. and the reaction was terminated, thereby the aqueous dispersion of the particulate polymer A5 was produced.

The number average particle diameter of the obtained particulate polymer A5 was 0.9 µm, and the glass transition temperature was −38° C.

(The Production of the Particulate Polymer B5)

To the reactor equipped with the stirrer, 10 parts in the solid base (that is, the weight base of the particulate polymer B1) of the aqueous dispersion of the particulate polymer B1 obtained in the above step (1-2), 0.15 parts of sodium lauryl sulfate ("EMAL 2F" made by Kao Corporation) as emulsifier, and 0.5 parts of ammonium persulfate were supplied, and the vapor part was substituted with nitrogen gas, and the temperature was raised to 70° C.

On the other hand, in other container, 50 parts of ion exchange water, 0.5 parts of sodium dodecylbenzenesulfonate, 80 parts of styrene and 18 parts of butyl acrylate as the polymerizable monomer, 2 parts of acrylonitrile, 2 parts of methacrylic acid, 1.2 parts of acrylamide were mixed, thereby the monomer mixture was obtained. This monomer mixture was continuously added to said reactor using 4 hours; thereby the polymerization was carried out. During the addition, the reaction was carried out at 70° C. After completing the addition, it was stirred for 3 hours at 70° C. and the reaction was terminated, thereby the aqueous dispersion of the particulate polymer B5 was produced.

The number average particle diameter of the obtained particulate polymer B5 was 0.9 µm, and the glass transition temperature was 72° C.

TABLE 1

|  |  | A1 | A2 | A3 | A4 | A5 | A6 | A7 | A8 |
|---|---|---|---|---|---|---|---|---|---|
| Monomer | BA | 94.8 | 73 | 88 | 94.8 | 94.8 | 78 | 48 | |
|  | 2EHA | 0 | 0 | 10 | 0 | 0 | 20 | 0 | |
|  | EA |  |  |  |  |  |  |  | 86.8 |
|  | ST | 0 | 25 | 0 | 0 | 0 | 0 | 50 | |
|  | AN | 2 | 0 | 0 | 2 | 2 | 0 | 0 | 10 |
|  | MAA | 2 | 2 | 2 | 2 | 2 | 0 | 0 | 2 |
|  | NMA | 1.2 | 1.2 | 1.2 | 1.2 | 1.2 | 1.2 | 1.2 | 1.2 |
|  | E-2F | 0.15 | 0.15 | 0.15 | 1 | 0.3 | 0.15 | 0.15 | 0.15 |
|  | Las-Na | 0.5 | 0.5 | 0.5 | 0.5 | 1 | 0.5 | 0.5 | 0.5 |
| Glass transition temperature Tg | (° C.) | −38 | −25 | −45 | −38 | −38 | −55 | 10 | 4 |
| Number average particle diameter | (µm) | 0.36 | 0.35 | 0.36 | 0.15 | 0.9 | 0.37 | 0.29 | 0.37 |
| Swelling ratio in the electrolytic solution | (Times) | 4 | 3 | 3.1 | 4 | 4 | 2.7 | 3.1 | 4 |

|  |  | B1 | B2 | B3 | B4 | B5 | B6 | B7 |
|---|---|---|---|---|---|---|---|---|
| Monomer | BA | 18 | 0 | 28 | 18 | 18 | 33 | 0 |
|  | ST | 80 | 90 | 70 | 80 | 80 | 65 | 85 |
|  | AN | 2 | 2 | 2 | 2 | 2 | 2 | 2 |
|  | MAA | 2 | 10 | 2 | 2 | 2 | 2 | 15 |
|  | AAm | 1.2 | 1.2 | 1.2 | 1.2 | 1.2 | 1.2 | 1.2 |
|  | E-2F | 0.15 | 0.15 | 0.15 | 1 | 0.3 | 0.15 | 0.15 |
|  | Las-Na | 0.5 | 0.5 | 0.5 | 0.5 | 1 | 0.5 | 0.5 |
| Glass transition temperature Tg | (° C.) | 72 | 115 | 55 | 72 | 72 | 45 | 125 |
| Number average particle diameter | (µm) | 0.35 | 0.3 | 0.35 | 0.15 | 0.9 | 0.35 | 0.25 |
| Swelling ratio in the electrolytic solution | (Times) | 2.5 | 2.1 | 2 | 2.5 | 2.5 | 2.1 | 1.9 |

Note that, in Table 1, BA refers to butyl acrylate, 2EHA refers to 2-ethylhexyl acrylate, EA refers to ethyl acrylate, ST refers to styrene, AN refers to acrylonitrile, MAA refers to methacrylic acid, NMA refers to N-methylol acrylamide, AAm refers to acrylamide, E-2F refers to sodium lauryl sulfate ("EMAL 2F" made by Kao Corporation), and Las-Na refers to sodium dodecylbenzenesulfonate. Also, the particulate polymers A6 and A7 in Table 1 does not satisfy the glass transition temperature of the particulate polymer A defined in the present invention, and the particulate polymers B6 and B7 does not satisfy the glass transition temperature of the particulate polymer B defined in the present invention.

Example 2

Other than using the particulate polymer A2 instead of the particulate polymer A1, the separator with the adhesive layer, the electrode/separator laminate and the lithium ion secondary battery was produced as same as the example 1. The results are shown in Table 2.

Example 3

Other than using the particulate polymer B2 instead of the particulate polymer B1, the separator with the adhesive layer, the electrode/separator laminate and the lithium ion secondary battery was produced as same as the example 1. The results are shown in Table 2.

Example 4

Other than using the particulate polymer A3 instead of the particulate polymer A1, the separator with the adhesive layer, the electrode/separator laminate and the lithium ion secondary battery was produced as same as the example 1. The results are shown in Table 2.

Example 5

Other than using the particulate polymer B3 instead of the particulate polymer B1, the separator with the adhesive layer, the electrode/separator laminate and the lithium ion secondary battery was produced as same as the example 1. The results are shown in Table 2.

Example 6

Except for making the average thickness of the adhesive layer to 0.95 μm, the separator with the adhesive layer, the electrode/separator laminate and the lithium ion secondary battery was produced as same as the example 1. The results are shown in Table 2.

Example 7

Except for making the average thickness of the adhesive layer to 0.25 μm, the separator with the adhesive layer, the electrode/separator laminate and the lithium ion secondary battery was produced as same as the example 1. The results are shown in Table 2.

Example 8

Except for setting the temperature of the thermocompression bonding to 95° C. during the step (1-8) of the example 1, the separator with the adhesive layer, the electrode/separator laminate and the lithium ion secondary battery was produced as same as the example 1. The results are shown in Table 2.

Example 9

Except for setting the temperature of the thermocompression bonding to 55° C. during the step (1-8) of the example 1, the separator with the adhesive layer, the electrode/separator laminate and the lithium ion secondary battery was produced as same as the example 1. The results are shown in Table 2.

Example 10

Except for using the particulate polymer A4 instead of particulate polymer A1, and using the particulate polymer B4 instead of the particulate polymer B1, the separator with the adhesive layer, the electrode/separator laminate and the lithium ion secondary battery was produced as same as the example 1. The results are shown in Table 2.

Example 11

Except for using the particulate polymer A5 instead of particulate polymer A1, also using the particulate polymer B5 instead of the particulate polymer B1, and setting the average thickness of the adhesive layer to 0.9 μm, the separator with the adhesive layer, the electrode/separator laminate and the lithium ion secondary battery was produced as same as the example 1. The results are shown in Table 2.

Example 12

Except for setting the solid weight ratio (A1/B1) between the particulate polymer A1 and the particulate polymer B1 to 5/95, the separator with the adhesive layer, the electrode/separator laminate and the lithium ion secondary battery was produced as same as the example 1. The results are shown in Table 2.

Example 13

Except for setting the solid weight ratio (A1/B1) between the particulate polymer A1 and the particulate polymer B1 to 35/65, the separator with the adhesive layer, the electrode/separator laminate and the lithium ion secondary battery was produced as same as the example 1. The results are shown in Table 2.

Example 14

Except for using the particulate polymer A8 instead of the particulate polymer A1, the separator with the adhesive layer, the electrode/separator laminate and the lithium ion secondary battery was produced as same as the example 1. The results are shown in Table 2.

Comparative Example 1

Except for using the particulate polymer A6 instead of the particulate polymer A1, the separator with the adhesive layer, the electrode/separator laminate and the lithium ion secondary battery was produced as same as the example 1. The results are shown in Table 2.

Comparative Example 2

Except for using the particulate polymer A7 instead of the particulate polymer A1, the separator with the adhesive layer, the electrode/separator laminate and the lithium ion secondary battery was produced as same as the example 1. The results are shown in Table 2.

Comparative Example 3

Except for using the particulate polymer B6 instead of the particulate polymer B1, the separator with the adhesive layer, the electrode/separator laminate and the lithium ion secondary battery was produced as same as the example 1. The results are shown in Table 2.

Comparative Example 4

Except for using the particulate polymer B7 instead of the particulate polymer B1, the separator with the adhesive layer, the electrode/separator laminate and the lithium ion secondary battery was produced as same as the example 1. The results are shown in Table 2.

Comparative Example 5

Except for setting the average thickness of the adhesive layer to 1.1 nm, the separator with the adhesive layer, the electrode/separator laminate and the lithium ion secondary battery was produced as same as the example 1. The results are shown in Table 2.

Comparative Example 6

Except for not forming the adhesive layer, the separator with the adhesive layer, the electrode/separator laminate and the lithium ion secondary battery was produced as same as the example 1. The results are shown in Table 2.

Comparative Example 7

The aqueous dispersion of the particulate polymers A1 and B1 were mixed in NMP so that the solid weight ratio (A1/B1) was 15/85, the water was evaporated using the evaporator, and further it was diluted with NMP so that the solid concentration of polymer A1 and the polymer B1 was 3 wt %; thereby the slurry for the adhesive layer was obtained.

On one side of the porous polyethylene film (thickness of 16 μm, and the Gurley value of 147 sec/100 cc), said slurry for the adhesive layer was coated, and dried for 10 minutes at 60° C. Next, said slurry for the adhesive layer was coated on other side of the porous polyethylene film in a similar manner, thereby the separator with the adhesive layer was obtained. The thickness of one side of the adhesive layer of the obtained separator was 0.8 μm. Then, the electrode/separator laminate and the lithium ion secondary battery was produced as same as the example 1. The results are shown in Table 2.

The polymers A1 and B1 were dissolved in the slurry for the adhesive layer, thus the polymers infiltrated into the pores of the separator. As a result, the ionic conductivity of the separator was compromised; further the rate characteristic and the cycle characteristic of the lithium ion secondary battery obtained were deteriorated. Also, the polymers A1 and B1 in the adhesive layer were not particulate form, rather it was film form, and hence the pores of the separator were covered.

Comparative Example 8

Except for setting the temperature of the temperature of the thermocompression bonding to 45° C. during the step (1-8) of the example 1, the separator with the adhesive layer, the electrode/separator laminate and the lithium ion secondary battery was produced as same as the example 1. The results are shown in Table 2.

Comparative Example 9

Except for setting the temperature of the temperature of the thermocompression bonding to 110° C. during the step (1-8) of the example 1, the separator with the adhesive layer, the electrode/separator laminate and the lithium ion secondary battery was produced as same as the example 1. The results are shown in Table 2.

Comparative Example 10

The particulate polymer A1 was not used, and the lubricant (the product name: SN wet 980 made by SAN NOPCO LIMITED) was mixed so that the solid ratio was 5 parts with respect to the amount of the polymer B1 (100 parts) in the aqueous dispersion of the particulate polymer B1, then further it was diluted with NMP so that the solid concentration of the particulate polymer B1 and the lubricant was 3 wt %; thereby the slurry for the adhesive layer was obtained.

Except for using the above described slurry for the adhesive layer to obtain the separator with the adhesive layer as similar in the example 1, the electrode/separator laminate and the lithium ion secondary battery was produced as same as the example 1. The results are shown in Table 2.

TABLE 2

| | | Example 1 | Example 2 | Example 3 | Example 4 | Example 5 | Example 6 | Example 7 |
|---|---|---|---|---|---|---|---|---|
| Particulate polymer A (Tg) | | A1(−38) | A2(−25) | A1(−38) | A3(−45) | A1(−38) | A1(−38) | A1(−38) |
| Particulate polymer B (Tg) | | B1(72) | B1(72) | B2(115) | B1(72) | B3(55) | B1(72) | B1(72) |
| Polymer weight ratio (A/B) | | 15/85 | 15/85 | 15/85 | 15/85 | 15/85 | 15/85 | 15/85 |
| Average thickness of adhesive layer (μm) | | 0.8 | 0.8 | 0.8 | 0.8 | 0.8 | 0.95 | 0.25 |
| Thermocompression bonding condition | Temperature (° C.) | 80 | 80 | 80 | 80 | 80 | 80 | 80 |
| | Pressure (MPa) | 1 | 1 | 1 | 1 | 1 | 1 | 1 |
| | Time (min) | 2 | 2 | 2 | 2 | 2 | 2 | 2 |
| Permeability X (before thermocompression bonding) | | 178 | 175 | 180 | 177 | 175 | 245 | 173 |
| Permeability Y (after thermocompression bonding) | | 190 | 184 | 185 | 183 | 187 | 250 | 185 |
| Permeability changing rate (Y/X) | | 1.1 | 1.1 | 1.0 | 1.0 | 1.1 | 1.0 | 1.1 |
| Electrode adhesiveness | | A | A | A | A | A | A | A |
| Rate characteristic test | | A | A | A | A | A | B | A |
| Cycle characteristic test | | A | A | B | A | A | A | B |

TABLE 2-continued

|  | Example 8 | Example 9 | Example 10 | Example 11 | Example 12 | Example 13 | Example 14 |
|---|---|---|---|---|---|---|---|
| Particulate polymer A (Tg) | A1(−38) | A1(−38) | A4(−38) | A5(−38) | A1(−38) | A1(−38) | A8(4) |
| Particulate polymer B (Tg) | B1(72) | B1(72) | B4(72) | B5(72) | B1(72) | B1(72) | B1(72) |
| Polymer weight ratio (A/B) | 15/85 | 15/85 | 15/85 | 15/85 | 5/95 | 35/65 | 15/85 |
| Average thickness of adhesive layer (μm) | 0.8 | 0.8 | 0.8 | 0.9 | 0.8 | 0.8 | 0.8 |
| Thermocompression bonding condition Temperature (° C.) | 95 | 55 | 80 | 80 | 80 | 80 | 80 |
| Pressure (MPa) | 1 | 1 | 1 | 1 | 1 | 1 | 1 |
| Time (min) | 2 | 2 | 2 | 2 | 2 | 2 | 2 |
| Permeability X (before thermocompression bonding) | 180 | 175 | 175 | 175 | 175 | 175 | 178 |
| Permeability Y (after thermocompression bonding) | 260 | 186 | 186 | 186 | 186 | 186 | 185 |
| Permeability changing rate (Y/X) | 1.4 | 1.1 | 1.1 | 1.1 | 1.1 | 1.1 | 1.0 |
| Electrode adhesiveness | A | A | A | A | A | A | B |
| Rate characteristic test | B | A | B | B | A | B | A |
| Cycle characteristic test | A | B | A | A | B | A | B |

|  | Comparative example 1 | Comparative example 2 | Comparative example 3 | Comparative example 4 | Comparative example 5 |
|---|---|---|---|---|---|
| Particulate polymer A (Tg) | A6(−55) | A7(10) | A1(−38) | A1(−38) | A1(−38) |
| Particulate polymer B (Tg) | B1(72) | B1(72) | B6(45) | B7(125) | B1(72) |
| Polymer weight ratio (A/B) | 15/85 | 15/85 | 15/85 | 15/85 | 15/85 |
| Average thickness of adhesive layer (μm) | 0.8 | 0.8 | 0.8 | 0.8 | 1.1 |
| Thermocompression bonding condition Temperature (° C.) | 80 | 80 | 80 | 80 | 80 |
| Pressure (MPa) | 1 | 1 | 1 | 1 | 1 |
| Time (min) | 2 | 2 | 2 | 2 | 2 |
| Permeability X (before thermocompression bonding) | 237 | 190 | 265 | 169 | 185 |
| Permeability Y (after thermocompression bonding) | 2730 | 191 | 14000 | 180 | 14000 |
| Permeability changing rate (Y/X) | 11.5 | 1.0 | 52.8 | 1.1 | 75.7 |
| Electrode adhesiveness | A | B | A | B | A |
| Rate characteristic test | C | A | C | A | D |
| Cycle characteristic test | B | C | C | C | C |

|  | Comparative example 6 | Comparative example 7 | Comparative example 8 | Comparative example 9 | Comparative example 10 |
|---|---|---|---|---|---|
| Particulate polymer A (Tg) | — | A1(−38) | A1(−38) | A1(−38) | — |
| Particulate polymer B (Tg) | — | B1(72) | B1(72) | B1(72) | B1(72) |
| Polymer weight ratio (A/B) |  | 15/85 | 15/85 | 15/85 | 0/100 |
| Average thickness of adhesive layer (μm) | なし | 0.8 | 0.8 | 0.8 | 0.8 |
| Thermocompression bonding condition Temperature (° C.) | 80 | 80 | 45 | 110 | 110 |
| Pressure (MPa) | 1 | 1 | 1 | 1 | 1 |
| Time (min) | 2 | 2 | 2 | 2 | 2 |
| Permeability X (before thermocompression bonding) | 147 | 14000 | 165 | 170 | 171 |
| Permeability Y (after thermocompression bonding) | 147 | 14000 | 170 | 14000 | 175 |
| Permeability changing rate (Y/X) | 1.0 | 1.0 | 1.0 | 82.4 | 1.0 |
| Electrode adhesiveness | B | A | B | A | B |
| Rate characteristic test | A | D | A | D | A |
| Cycle characteristic test | D | C | D | D | D |

According to Table 1 and Table 2, for the examples satisfying the requirement of the present invention, the lithium ion secondary battery having excellent reliability (the rate characteristic and the cycle characteristic) were obtained.

The invention claimed is:

1. A method for producing laminate of electrode and separator comprising, a step of laminating a separator with adhesive layer which comprises an adhesive layer on at least one side of a porous polyolefin film, and an electrode comprising an electrode active material layer including an electrode active material and an electrode binder, so that said adhesive layer and said electrode active material layer are in contact, then carrying out a thermocompression bonding, wherein said adhesive layer includes a particulate polymer A having a glass transition temperature of −50 to 5° C. and a particulate polymer B having a glass transition temperature of 50 to 120° C., a thickness of said adhesive layer is 0.2 to 1.0 μm, and said thermocompressing bonding is carried out at 50 to 100° C.

2. The method for producing laminate of electrode and separator as set forth in claim 1, wherein a number average particle diameter of said particulate polymer A and said particulate polymer B is 0.1 to 1 μm.

3. The method for producing laminate of electrode and separator as set forth in claim 1, wherein said electrode binder includes a particulate polymer having a glass transition temperature of −50 to 5° C.

4. The method for producing laminate of electrode and separator as set forth in claim 1 comprising a step of coating an aqueous dispersion slurry for the adhesive layer including the particulate polymer A and the particulate polymer B, and having the viscosity of 0.001 to 0.1 Pa·s on said porous polyolefin film, and drying thereof, thereby obtaining the separator with adhesive layer.

5. The method for producing laminate of electrode and separator as set forth in claim 4, wherein a solid concentration of said aqueous dispersion slurry for the adhesive layer is 1 to 20 wt %.

6. The method for producing laminate of electrode and separator as set forth in claim 1, wherein a swelling ratio of said particulate polymer A and said particulate polymer B when immersed in a mixed solvent (ethylene carbonate/diethyl carbonate=1/2 (volume ratio)) including lithium salt $LiPF_6$ (concentration of 1 mol/L) is 1 to 5 times.

7. A lithium ion secondary battery comprising laminate of electrode and separator obtained by the production method as set forth in claim 1.

8. The method for producing laminate of electrode and separator as set forth in claim 2, wherein said electrode binder includes a particulate polymer having a glass transition temperature of −50 to 5° C.

9. The method for producing laminate of electrode and separator as set forth in claim 2 comprising a step of coating an aqueous dispersion slurry for the adhesive layer including the particulate polymer A and the particulate polymer B, and having the viscosity of 0.001 to 0.1 Pa·s on said porous polyolefin film, and drying thereof, thereby obtaining the separator with adhesive layer.

10. The method for producing laminate of electrode and separator as set forth in claim 3 comprising a step of coating an aqueous dispersion slurry for the adhesive layer including the particulate polymer A and the particulate polymer B, and having the viscosity of 0.001 to 0.1 Pa·s on said porous polyolefin film, and drying thereof, thereby obtaining the separator with adhesive layer.

11. The method for producing laminate of electrode and separator as set forth in claim 2, wherein a swelling ratio of said particulate polymer A and said particulate polymer B when immersed in a mixed solvent (ethylene carbonate/diethyl carbonate=1/2 (volume ratio)) including lithium salt $LiPF_6$ (concentration of 1 mol/L) is 1 to 5 times.

12. The method for producing laminate of electrode and separator as set forth in claim 3, wherein a swelling ratio of said particulate polymer A and said particulate polymer B when immersed in a mixed solvent (ethylene carbonate/diethyl carbonate=1/2 (volume ratio)) including lithium salt $LiPF_6$ (concentration of 1 mol/L) is 1 to 5 times.

13. The method for producing laminate of electrode and separator as set forth in claim 4, wherein a swelling ratio of said particulate polymer A and said particulate polymer B when immersed in a mixed solvent (ethylene carbonate/diethyl carbonate=1/2 (volume ratio)) including lithium salt $LiPF_6$ (concentration of 1 mol/L) is 1 to 5 times.

14. The method for producing laminate of electrode and separator as set forth in claim 5, wherein a swelling ratio of said particulate polymer A and said particulate polymer B when immersed in a mixed solvent (ethylene carbonate/diethyl carbonate=1/2 (volume ratio)) including lithium salt $LiPF_6$ (concentration of 1 mol/L) is 1 to 5 times.

15. A lithium ion secondary battery comprising laminate of electrode and separator obtained by the production method as set forth in claim 2.

16. A lithium ion secondary battery comprising laminate of electrode and separator obtained by the production method as set forth in claim 3.

17. A lithium ion secondary battery comprising laminate of electrode and separator obtained by the production method as set forth in claim 4.

18. A lithium ion secondary battery comprising laminate of electrode and separator obtained by the production method as set forth in claim 5.

19. A lithium ion secondary battery comprising laminate of electrode and separator obtained by the production method as set forth in claim 6.

20. The method for producing laminate of electrode and separator as set forth in claim 1, wherein a weight ratio (A/B) between the particulate polymer A and the particulate polymer B is within the range of 10/90 to 20/80.

* * * * *